United States Patent [19]

Zimmer

[11] Patent Number: 4,620,983
[45] Date of Patent: Nov. 4, 1986

[54] METHOD OF AND SYSTEM FOR MONITORING AND APPLYING LIQUID FOAM TO A SUBSTRATE

[76] Inventor: Johannes Zimmer, Ebentaler Str. 133, 9020 Klagenfurt, Austria

[21] Appl. No.: 623,425

[22] Filed: Jun. 22, 1984

[30] Foreign Application Priority Data

Jun. 23, 1983 [AT] Austria ............................... 2313/83

[51] Int. Cl.⁴ .............................................. B05D 5/00
[52] U.S. Cl. ..................................... 427/8; 73/32 R; 73/54; 118/688; 118/712; 137/92; 156/64; 156/356; 156/378; 427/244
[58] Field of Search ................ 73/32 R, 54; 118/688, 118/712; 137/92; 156/64, 356, 378; 427/8, 244; 264/50; 401/44, 47

[56] References Cited

U.S. PATENT DOCUMENTS

| | | | |
|---|---|---|---|
| 3,100,390 | 8/1963 | Banks | 73/32 |
| 3,431,081 | 3/1969 | Edwards et al. | 137/92 X |
| 4,035,529 | 7/1977 | Meisert et al. | 156/78 X |
| 4,059,466 | 11/1977 | Scholl et al. | 156/78 |
| 4,423,161 | 12/1983 | Cobbs et al. | 264/50 X |
| 4,445,526 | 5/1984 | Woestman | 137/92 X |
| 4,552,778 | 11/1985 | Zimmer | 427/244 X |

*Primary Examiner*—Robert A. Dawson
*Attorney, Agent, or Firm*—Karl F. Ross; Herbert Dubno

[57] ABSTRACT

Liquid foam to be applied through a slot nozzle to a surface of a fabric web or other substrate is preliminarily collected in a storage vessel where its consistency is continuously monitored and maintained substantially constant. The rate of transfer from the storage vessel to the applicator is stabilized by a feedback signal from a volume or pressure sensor in the applicator. Excess foam may be recirculated from the applicator to the source.

16 Claims, 2 Drawing Figures

METHOD OF AND SYSTEM FOR MONITORING AND APPLYING LIQUID FOAM TO A SUBSTRATE

FIELD OF THE INVENTION

My present invention relates to a method of and a system for applying liquid foam to a fabric web or other substrate which passes continuously underneath a slot nozzle of an applicator extending across the path of the substrate.

BACKGROUND OF THE INVENTION

Detergents and other treatment agents to be applied in foamy condition to a moving substrate of significant width, e.g. 5 m and more, are difficult to apply with the uniformity usually desired. Such uniformity is especially hard to maintain when only a thin layer of the treatment agent is to be spread over the surface of the substrate even as the consistency and other properties of the foam are to be preserved up to the point of its deposition, to be followed by its subsequent dissolution without traces. Thus, conventional wisdom dictates that the liquid foam ought to be applied as soon as possible after it has been generated, in order to prevent any intervening deterioration.

It is therefore customary to juxtapose the applicator closely with the foam generator; this, however, impedes the desired uniformization since the usual foaming devices respond but slowly to corrective signals indicating a deviation of the dispensed foam from an established norm.

OBJECT OF THE INVENTION

The object of my present invention, accordingly, is to provide a method of and a system for improving the uniformity of liquid foam applied to the surface of a continuously moving substrate, especially when that surface is of considerable width.

SUMMARY OF THE INVENTION

I have found, in accordance with my present invention, that this object can be achieved by preliminarily accumulating a quantity of the prepared liquid foam in a storage vessel in which its consistency is continuously monitored and deviations from a predetermined value are rectified. It is from this storage vessel that the liquid foam is continuously fed to the applicator.

In particular, the maintenance of a desired consistency is readily accomplished by stirring the contents of the storage vessel at a variable rate depending on the deviations to be corrected. This can be done with the aid of one or more mechanical agitators, mixing heads or similar devices whose mode of operation can be rapidly adjusted by signals emitted, for example, by a densimeter or a weighing scale continuously determining the liquid/air ratio of the foam.

Although in some instances the liquid foam can be produced directly in the storage vessel, it will often be more convenient to provide for this purpose a separate container upstream of that vessel. As long as the rate of foam transfer from the storage vessel to the applicator is held substantially constant in keeping with the rate of discharge onto the substrate, the rate of foam production can vary rather widely. It may also be advantageous, pursuant to another feature of my invention, to recirculate excess foam at a controlled rate back to the storage vessel with replenishment of spent liquid in the return path.

BRIEF DESCRIPTION OF THE DRAWING

The above and other features of my invention will now be described in detail with reference to the accompanying drawing in which.

SPECIFIC DESCRIPTION

Figure 1:
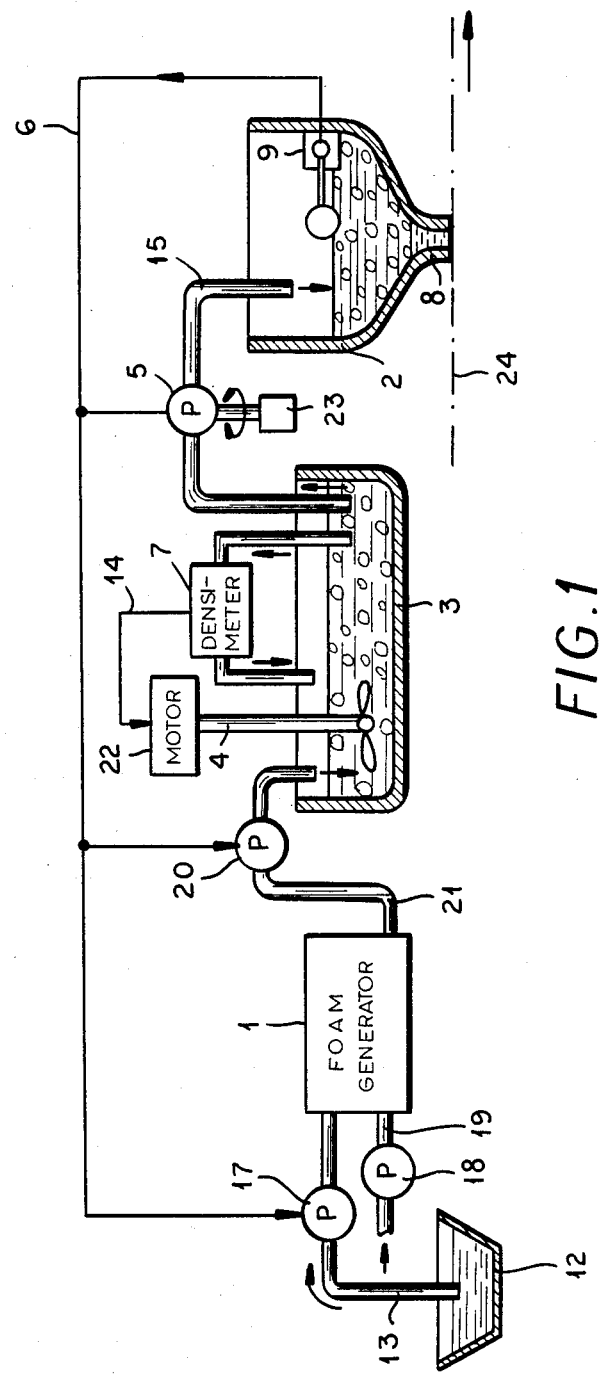
FIG. 1 is a diagrammatic representation of a system for applying liquid foam to a substrate in accordance with my present invention.

As shown in FIG. 1, a conventional foam generator 1 receives treatment liquid from a reservoir 12, via a conduit 13 and a pump 17, while air under pressure is being supplied by another pump 18 through a conduit 19. The pressure inside the container may range between 3 and 8 bar. The resulting liquid foam is fed via a pipe 21, by means of a pump 20, to an upwardly open storage vessel 3 whose contents are continuously monitored by a densimeter 7 controlling via a lead 14 a motor 22 which drives a mechanical agitator 4. In the case of a wide vessel 3, several such agitators may be operated in parallel.

A tube 15, provided with a feed pump 5, steadily supplies liquid foam from vessel 3 to an applicator 2 here shown as an open-topped receptable provided at its bottom with a nozzle 8 in the form of an elongate slot. Nozzle 8 extends completely across the width of a continuously moving substrate 24, e.g. a web of paper or fabric, over whose upper surface the foam is being spread as a thin layer. A sensor 9 in applicator 2, such as a float-type level detector, controls via an output lead 6 the pumps 5, 17 and 20 with a view to keeping the volume of foam in applicator 2 substantially constant.

As further shown in FIG. 1, pump 5 is horizontally reciprocated by a servomotor 23 in order to sweep the discharge end of tube 15 across the width of applicator 2 for a uniform transfer of liquid foam into same. Alternatively, vessel 3 could be provided with an overflow edge for supplying the foam directly to the applicator over substantially its full width, the rate of supply being then adjustable by variably tilting the vessel above the applicator. A further possitility is to use adjustable suction for transferring the foam from storage vessel 3 to applicator 2. The mode of transfer depends, inter alia, on the desired degree of accuracy of the adjustment and on the nature of the treatment agent, taking e.g. into consideration the stability and pressure sensitivity of that agent.

The reciprocating transfer tube 15 could also be replaced by a stationary conduit terminating in a manifold with numerous outlets distributed over the width of applicator 2.

Figure 2:
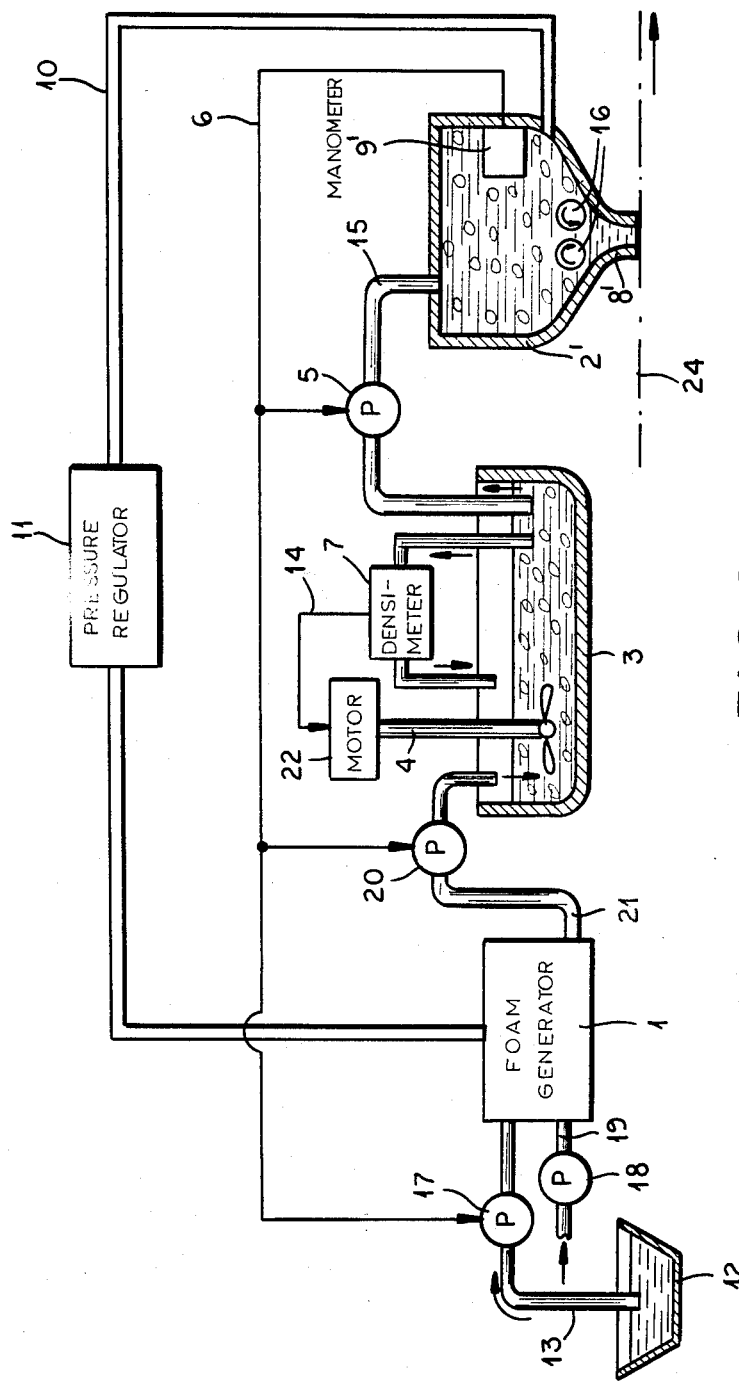
FIG. 2 is a view similar to that of FIG. 1, illustrating a modified system.

In FIG. 2 I have shown a system differing from that of FIG. 1 by the use of an applicator 2' in the form of a substantially closed receptacle into which liquid foam from storage vessel 3 is continuously fed by a force pump 5' under an adjustable pressure. The pump 5' keeps the applicator 2' continuously filled with foam, the supply pressure being sensed by a manometer 9' emitting corrective signals on lead 6 to pumps 5', 17 and 20. A conduit 10, connected to applicator 2' near its bottom, serves for the recirculation of excess liquid foam to storage vessel 3 by way of a pressure regulator 11, such as a throttle valve, the recirculation path also including the foam generator 1 which in this instance serves to supply make-up liquid from reservoir 12 in order to compensate for the spent material.

The nozzle 8' of applicator 2' is here shown overlain by a gear pump 16 designed to discharge the liquid foam at a constant rate; such a gear pump or its equivalent could also be provided in the applicator 2 of FIG. 1.

I claim:

1. A method of uniformly spreading a liquid foam over a moving substrate by way of an applicator provided with a slot nozzle extending across said substrate transversely to the direction of motion thereof, comprising the steps of:
   (a) preparing a liquid foam at a location spaced from said applicator;
   (b) preliminarily accumulating a quantity of said liquid foam in a storage vessel spaced from but connected to both said applicator and said location;
   (c) continuously monitoring the consistency of the liquid foam in said storage vessel and rectifying any deviations from a predetermined value;
   (d) continuously feeding liquid foam from said storage vessel to said applicator; and
   (e) continuously applying liquid foam from said applicator to said substrate through said nozzle.

2. A method as defined in claim 1 wherein step (c) includes stirring the contents of said storage vessel at a variable rate.

3. A method as defined in claim 1, comprising the further step of (f) continuously monitoring and keeping substantially constant the feed rate of liquid foam from said storage vessel to said applicator.

4. A method of uniformly spreading a liquid foam over a moving substrate by way of an applicator provided with a slot nozzle extending across said substrate transversely to the direction of motion thereof, comprising the steps of:
   (a) preparing a liquid foam at a location spaced from said applicator;
   (b) preliminarily accumulating a quantity of said liquid foam in a storage vessel spaced from but connected to both said applicator and said location;
   (c) continuously monitoring the consistency of the liquid foam in said storage vessel and rectifying any deviations from a predetermined value;
   (d) continuously feeding liquid foam from said storage vessel to said applicator; and
   (e) continuously applying liquid foam from said applicator to said substrate through said nozzle, excess liquid foam being recirculated at a controlled rate from said applicator to said storage vessel.

5. A method as defined in claim 4 wherein supplemental liquid is added to the liquid foam during recirculation thereof.

6. A system for uniformly spreading a liquid foam over a moving substrate, comprising:
   a source of liquid foam to be applied to the moving substrate;
   a storage vessel spaced from said source and adapted to hold a quantity of said liquid foam;
   an applicator spaced from but connected to said storage vessel for continuously receiving liquid foam therefrom, said applicator being provided with a slot nozzle overlying the path of motion of the substrate and extending transversely to said path for continuously spreading said liquid foam over said substrate;
   monitoring means in said storage vessel for continuously detecting deviations of the consistency of said liquid foam from a predetermined value; and
   agitator means in said storage vessel controlled by said monitoring means for rectifying said deviations.

7. A system as defined in claim 6 wherein said agitating means comprises a variable-speed stirrer.

8. A system as defined in claim 6 wherein said monitoring means comprises a density meter.

9. A system as defined in claim 6, further comprising sensing means in said applicator for checking the supply rate of liquid foam from said storage vessel and feed means in the connection between said storage vessel and said applicator controlled by said sensing means for keeping said supply rate substantially constant.

10. A system as defined in claim 9 wherein said connection is provided with drive means for sweeping an outlet thereof across the width of said applicator.

11. A system as defined in claim 6, further comprising pump means in said applicator for delivering liquid foam to said nozzle under increased pressure.

12. A system for uniformly spreading a liquid foam over a moving substrate, comprising:
    a source of liquid foam to be applied to the moving substrate;
    a storage vessel spaced from said source and adapted to hold a quantity of said liquid foam;
    an applicator spaced from but connected to said storage vessel for continuously receiving liquid foam therefrom, said applicator being provided with a slot nozzle overlying the path of motion of the substrate and extending transversely to said path for continuously spreading said liquid foam over said substrate;
    monitoring means in said storage vessel for continuously detecting deviations of the consistency of said liquid foam from a predetermined value;
    agitator means in said storage vessel controlled by said monitoring means for rectifying said deviations; and
    conduit means extending between said applicator and said storage vessel for recirculating excess liquid foam to the latter.

13. A system as defined in claim 12 wherein said conduit means includes a pressure regulator.

14. A system as defined in claim 12 wherein said conduit means includes a supply of make-up liquid.

15. A system as defined in claim 9 wherein said applicator comprises a receptacle substantially closed except for said nozzle, said feed means comprising a forced-circulation pump supplying the liquid foam to said applicator under a pressure controlled by said sensing means.

16. A system as defined in claim 6 wherein said source comprises a container upstream of said storage vessel communicating with a supply of liquid and pressurized air.

* * * * *